United States Patent
Min et al.

(10) Patent No.: US 10,059,217 B2
(45) Date of Patent: Aug. 28, 2018

(54) SYSTEM AND METHOD FOR CONTROLLING BATTERY SWITCHING SERIAL/PARALLEL CONNECTION OF BATTERY MODULES DUE TO ACCELERATOR OPERATION

(71) Applicant: Hyundai Motor Company, Seoul (KR)

(72) Inventors: Hong Seok Min, Yongin (KR); Seung Ho Ahn, Hanam-Si (KR); Sung Min Choi, Gyeongsangbuk-do (KR); Ik Kyu Kim, Guro-gu (KR)

(73) Assignee: Hyundai Motor Company, Seoul (KR)

( * ) Notice: Subject to any disclaimer, the term of this patent is extended or adjusted under 35 U.S.C. 154(b) by 469 days.

(21) Appl. No.: 14/568,141

(22) Filed: Dec. 12, 2014

(65) Prior Publication Data

US 2016/0046201 A1 Feb. 18, 2016

(30) Foreign Application Priority Data

Aug. 12, 2014 (KR) .................. 10-2014-0104351

(51) Int. Cl.
*H01M 2/10* (2006.01)
*H01M 10/44* (2006.01)
(Continued)

(52) U.S. Cl.
CPC ......... *B60L 11/1855* (2013.01); *B60L 3/0046* (2013.01); *B60L 3/12* (2013.01);
(Continued)

(58) Field of Classification Search
CPC .............. H01M 10/425; H01M 2/1077; B60L 11/1866; B60L 11/1855; B60L 11/1809;
(Continued)

(56) References Cited

U.S. PATENT DOCUMENTS 5,706,910 A * 1/1998 Kobayashi ............ B60L 3/0015
180/274
5,931,245 A * 8/1999 Uetake ...................... B60L 3/00
180/65.8

(Continued)

FOREIGN PATENT DOCUMENTS

JP 2006-067683 A 3/2006
JP 2008-303058 A 12/2008
(Continued)

*Primary Examiner* — Sean P Cullen
(74) *Attorney, Agent, or Firm* — Mintz Levin Cohn Ferris Glovsky and Popeo, P.C.; Peter F. Corless

(57) ABSTRACT

A system for controlling a battery to extend a driving mileage is provided. The system supplies a high voltage required to drive a motor by connecting a plurality of batteries in series by turning off a battery switching unit during engaged of an accelerator and balances voltage between the plurality of batteries. A voltage deviation is managed by connecting the plurality of batteries in parallel by turning on the battery switching unit when the accelerator is disengaged. The system includes a plurality of battery modules and a battery switching unit configured to connect the plurality of battery modules in parallel when an accelerator is disengaged and connect the plurality of battery modules in series when the accelerator is engaged. A motor driving unit is configured to receive an output by the battery switching unit when the accelerator is engaged.

6 Claims, 3 Drawing Sheets

(51) Int. Cl.
  *B60L 3/00* (2006.01)
  *B60L 3/12* (2006.01)
  *B60L 7/10* (2006.01)
  *B60L 7/12* (2006.01)
  *B60L 11/18* (2006.01)
  *H01M 10/42* (2006.01)

(52) U.S. Cl.
  CPC .............. *B60L 7/10* (2013.01); *B60L 7/12* (2013.01); *B60L 11/1809* (2013.01); *B60L 11/1816* (2013.01); *B60L 11/1861* (2013.01); *B60L 11/1866* (2013.01); *B60L 11/1877* (2013.01); *H01M 2/1077* (2013.01); *H01M 10/425* (2013.01); *B60L 2210/30* (2013.01); *B60L 2240/12* (2013.01); *H01M 2220/20* (2013.01); *Y02T 10/7005* (2013.01); *Y02T 10/7044* (2013.01); *Y02T 10/7061* (2013.01); *Y02T 10/7072* (2013.01); *Y02T 10/7241* (2013.01); *Y02T 90/127* (2013.01); *Y02T 90/14* (2013.01)

(58) Field of Classification Search
  CPC .............. B60L 11/1816; B60L 11/1861; B60L 11/1877; B60L 3/0046; B60L 3/12; B60L 7/10; B60L 7/12
  USPC .............. 429/50, 61, 149; 701/22; 180/65.1; 320/117, 118, 119, 120, 121, 136, 138
  See application file for complete search history.

(56) References Cited

U.S. PATENT DOCUMENTS

| | | | |
|---|---|---|---|
| 8,626,369 B2 | 1/2014 | Hermann et al. | |
| 2003/0107352 A1 | 6/2003 | Downer et al. | |
| 2008/0072859 A1* | 3/2008 | Esaka | H02J 7/0019 123/179.3 |
| 2008/0174274 A1* | 7/2008 | Kosaka | H02J 7/0016 320/117 |
| 2013/0181511 A1 | 7/2013 | Stewart et al. | |
| 2014/0216842 A1* | 8/2014 | Hayashi | H01M 2/1077 180/291 |

FOREIGN PATENT DOCUMENTS

| | | | |
|---|---|---|---|
| JP | 2010-011631 A | 1/2010 | |
| JP | WO 2013030883 A1 * | 3/2013 | .......... H01M 2/1077 |
| KR | 2010-005746 A | 1/2010 | |
| KR | 10-0951979 B1 | 4/2010 | |
| KR | 2014-0031034 A | 3/2014 | |
| KR | 2014-0038746 A | 3/2014 | |
| KR | 2014-0044370 A | 4/2014 | |

\* cited by examiner

SYSTEM AND METHOD FOR CONTROLLING BATTERY SWITCHING SERIAL/PARALLEL CONNECTION OF BATTERY MODULES DUE TO ACCELERATOR OPERATION

CROSS-REFERENCE TO RELATED APPLICATION

This application is based on and claims the benefit of priority to Korean Patent Application No. 10-2014-0104351, filed on Aug. 12, 2014 in the Korean Intellectual Property Office, the disclosure of which is incorporated herein in its entirety by reference.

TECHNICAL FIELD

The present disclosure relates to a system and a method for controlling a battery to extend a driving mileage, and more particularly, to a technology of balancing energy based on a battery switching technology depending on a driving mode.

BACKGROUND

A battery is configured to charge electric energy and supply the electric energy to various types of electronic devices. In particular, a secondary battery (cell) may recharge electric energy and is implemented by stacking a plurality of cells to increase an output. Accordingly, the secondary battery including the plurality of cells requires a battery management system (hereinafter, referred to as 'BMS') configured to manage the plurality of cells. When the plurality of cells are connected in series, the inter-cell balancing is an important factor. The inter-cell balancing may be the cell balancing that maintain each voltage charged in the plurality of cells configuring the battery within an allowable range. The cell balancing correlates with a battery lifespan, output power, and the like and when the cell balancing is not properly made, the cell deteriorates, and as a result, the lifespan and the output power of the battery may be reduced.

As the conventional method of creating the cell balancing, a method of reducing a cell voltage by disposing separate resistors in the plurality of cells, respectively and measuring the voltage of the respective cells to discharge the voltage through the resistors when cell having a substantially high voltage has been developed. In the battery configured of a first cell and a second cell, it is assumed that a voltage of the first cell is greater than that of the second cell. When the first cell and the second cell are simultaneously charged, the first cell is first charged up to a highest voltage within an allowable range. In particular, the first cell performs a discharging operation through the resistor and the second cell terminates a charging operation. Further, when the first cell is discharged up to a predetermined voltage, the first cell and the second cell are simultaneously charged again. When a voltage difference between the first cell and the second cell is within a predetermined range by repeating the operation, the balancing terminates.

However, the battery in which the plurality of cells are connected needs to be provided in the same cell specification to balance deviations such as resistance or voltage among the plurality of cells and has a structure in which the battery management system manages each of the cells.

SUMMARY

Accordingly, the present disclosure provides a system for controlling a battery to extend a driving mileage capable of supplying a substantially high voltage required to drive a motor by connecting a plurality of batteries in series by turning off a battery switching unit while operating an accelerator and performing voltage balancing among the plurality of batteries and managing a voltage deviation by connecting the plurality of batteries in parallel by turning on the battery switching unit when the accelerator is not yet operated.

According to an exemplary embodiment of the present disclosure, a system for operating a battery to extend a driving mileage may be executed by a controller and may include a plurality of battery modules; a battery switching unit configured to connect the plurality of battery modules in parallel when an accelerator is not yet operated and connect the plurality of battery modules in series when the accelerator is operated; and a motor driving unit configured to receive an output by the battery switching unit when the accelerator is operated.

The plurality of battery modules may have specifications different from each other. When the accelerator is not yet operated, the battery switching unit may be turned on and thus energy balancing may be achieved between the plurality of battery modules. When the accelerator is operated, the battery switching unit may be turned off and thus the plurality of battery modules may be configured to supply an output required to drive a motor. The system may further include: a regenerative braking unit and a charging unit configured to be connected to the plurality of battery modules to charge a current. The regenerative braking unit may be configured to recharge energy generated from a brake and the charging unit may be configured to recharge energy from an external charger.

According to another exemplary embodiment of the present disclosure, a method for controlling a battery to extend a driving mileage may include maintaining, by a controller, a substantially similar voltage by connecting a plurality of battery modules of a vehicle in parallel; and supplying, by the controller, an output required to drive a motor by connecting the plurality of battery modules in series when a driver operates an accelerator after the vehicle starts and balancing voltage among the plurality of battery modules by connecting the plurality of battery modules in parallel when the driver does not yet operate the accelerator (e.g., the accelerator is disengaged).

In the maintaining substantially the same voltage, the vehicle may be in a parking mode or a stopping mode or may be charged from an external charger. Any one of the plurality of battery modules may be charged with energy generated from a brake or energy supplied from an external charger.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
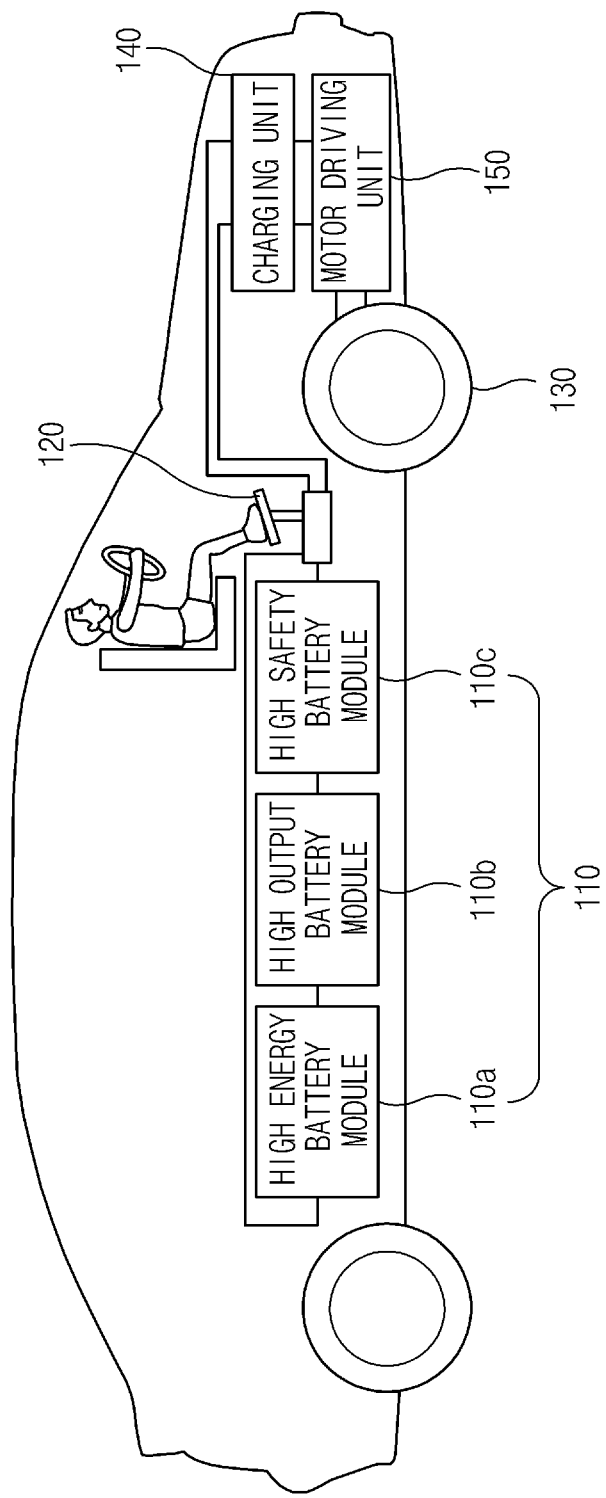
FIG. 1 is an exemplary diagram illustrating a vehicle in which a system for controlling a battery to extend a driving mileage according to an exemplary embodiment of the present disclosure is included.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The foregoing objects, features and advantages will become more apparent from the following detailed description of exemplary embodiments of the present disclosure with reference to accompanying drawings, which are set forth hereinafter. Accordingly, those having ordinary knowledge in the related art to which the present disclosure pertains will easily embody technical ideas or spirit of the present disclosure. Further, when the detailed description of technologies known in the related art are considered to make the gist of the present invention obscure in the present disclosure, the detailed description thereof will be omitted. Hereinafter, exemplary embodiments of the present disclosure will be described in detail with reference to the accompanying drawings.

FIG. 1 is an exemplary diagram illustrating a vehicle in which a system for controlling a battery to extend a driving mileage according to an exemplary embodiment of the present disclosure is included. Referring to FIG. 1, a system 100 for controlling a battery may include a battery module 110, a battery switching unit 120, a regenerative braking unit 130, a charging unit 140, and a motor driving unit 150. The battery module 110, the battery switching unit 120, the regenerative braking unit 130, the charging unit 140, and the motor driving unit 150 may be operated by a controller having a memory and a processor.

The battery module 110 may be configured to charge electric energy and supply the electric energy to various types of electronic devices. In particular, the battery module 110 may have a structure in which a plurality of batteries are connected to increase an output and the battery module 110 may include a high energy battery module 110a, a high output battery module 110b, and a high safety battery module 110c. The high energy battery module 110a is a battery module in which a cell having DC-IR of 1 mohm or greater and high-capacity performance is designed. The high energy battery module 110a may use a thick high-density electrode and reduce a content of a conductive material and reduce a high-capacity active material and a thickness of a separation membrane.

The high output battery module 110b is a battery module in which a cell having DC-IR of 1 mohm or greater and high output performance is designed. The high output battery module 110b may use a thin low-density electrode, increase a content of a conductive material, fine a particle size of an active material, and strengthen a heat radiating characteristic. The high safety battery module 110c is a battery module in which a cell having DC-IR of 1 mohm or greater and high safety performance is designed. The high safety battery module 110c may use an active material, a separation membrane, and an electrolyte which have excellent collision and through safety and use exterior materials or aids which are substantially strong against a collision during packaging the cell.

The battery switching unit 120 may be configured to turn an electrical connection between the plurality of battery modules 110 on or off. Each switching device (SW) included in the battery switching unit 120 may be configured to perform a turn on or off operation by a switch control signal. As the switching device (SW), all the switching devices which may be easily used by those skilled in the art, such as a mechanical relay, a photo MOS relay, a BJT, and a MOSFET may be used. Therefore, the scope of the present disclosure is not limited by a type of switching devices which is used in the battery switching unit 120. In particular, when an accelerator is operated (e.g., the accelerator is engaged), the battery switching unit 120 may be turned off to connect a plurality of cells of the battery in series, to thus supply a high voltage required to drive a motor. Further, when the accelerator is not yet operated, the battery switching unit 120 may be turned on to connect the plurality of cells of the battery in parallel to balance the voltage between the batteries, thereby adjusting a voltage deviation (balancing) between the batteries. In particular, the battery switching unit 120 may be referred to as an active call balancing apparatus.

The regenerative braking unit 130 may be configured to perform braking by converting kinetic energy into heat energy using a friction of the brake when the brake is operated while the vehicle is driven. In particular, all the energy may be converted into the heat energy and the heat energy may be converted into electricity or a voltage to be recharged in the battery. The charging unit 140 may be configured to supply power for charging the plurality of battery modules 110 and may continuously supply power using an external charging apparatus when the vehicle stops or is parked.

The motor driving unit 150 may be connected to receive power output from the battery module 110. The power supplied to the motor driving unit may be referred to as a load (not illustrated) which may be configured of a driving motor, a direct current to direct current (DC to DC) converter, and the like of an electric vehicle or a hybrid vehicle and the present disclosure is not limited to the types of loads. The motor driving unit 150 may be configured to drive the motor or stop the driving of the motor depending on the operation of the battery switching unit 120.

Figure 2A:
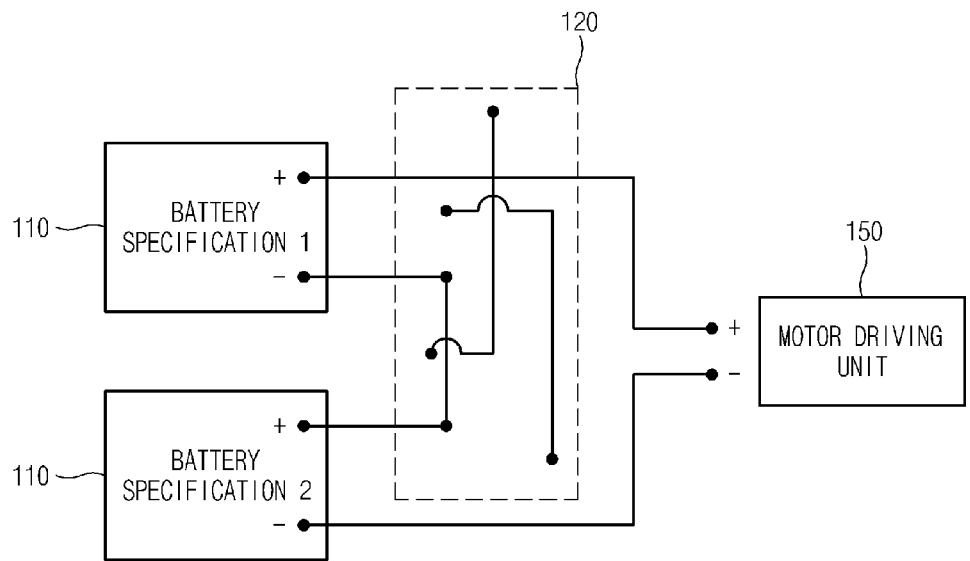
FIGS. 2A-2B are exemplary circuit block diagrams of a battery switching unit according to an exemplary embodiment of the present disclosure.
Figure 2B:
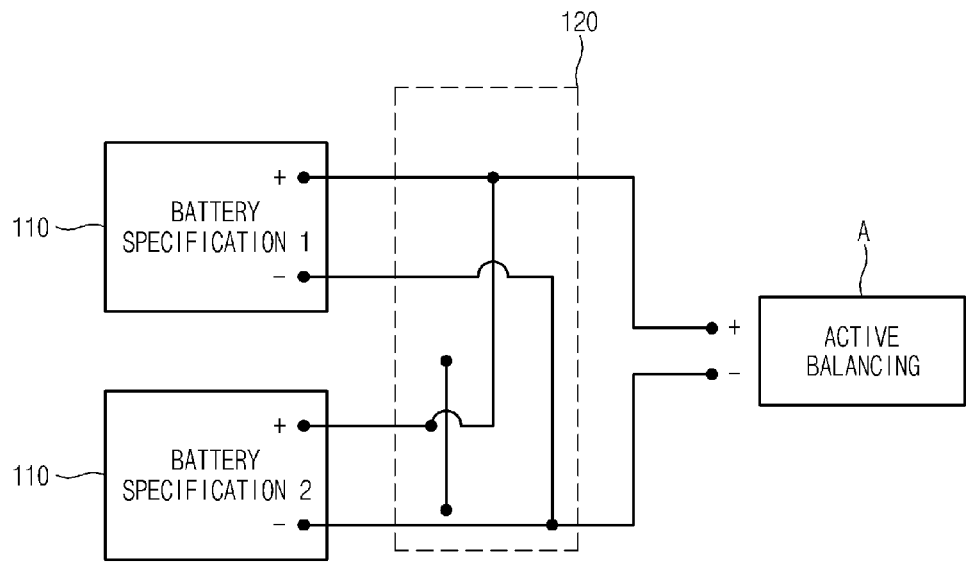

FIGS. 2A-2B are exemplary circuit block diagrams of a battery switching unit according to an exemplary embodiment of the present disclosure. FIG. 2A illustrates a circuit block diagram of the battery switching unit when the accelerator is operated and FIG. 2B illustrates a circuit block diagram of the battery switching unit when the accelerator is not yet operated.

A circuit operation of the battery switching unit 120 to turn on or off the electrical connection between the plurality of battery modules 110 will be described. In particular, the battery module 110 may include a plurality of structures in which battery specifications are different from each other. Specifically, when the accelerator is operated, the battery switching unit 120 may be turned off to connect the battery modules 110 in series to thus supply the high voltage required to drive the motor to the motor driving unit 150. Further, when the accelerator is not yet operated, the battery switching unit 120 may be turned on to connect the battery modules 110 in parallel to thus balance voltage A between the battery modules 110.

Figure 3A:
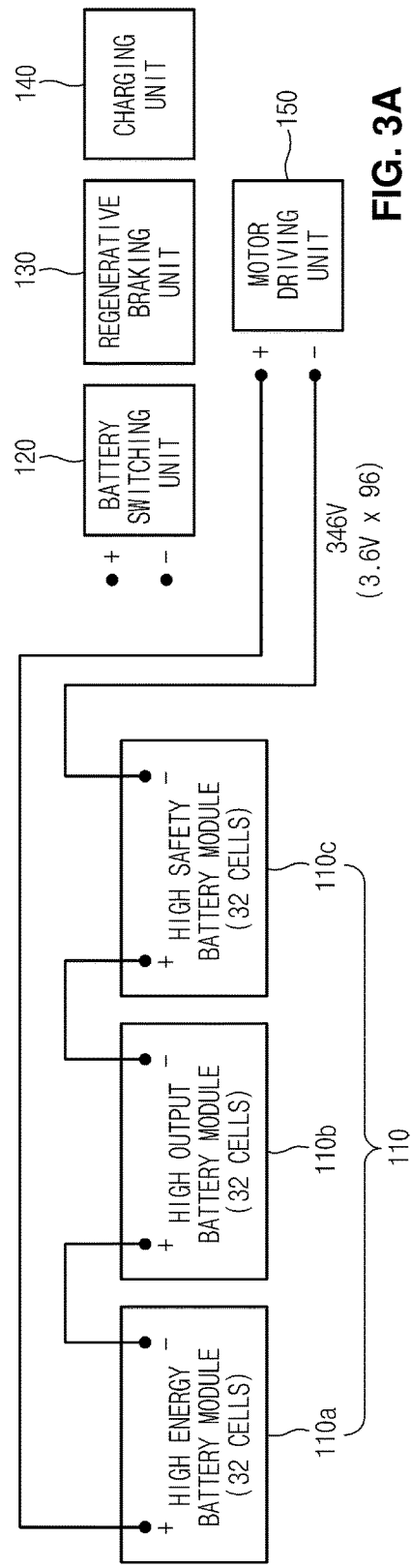
FIGS. 3A-3B are exemplary structure diagrams illustrating a method for controlling a battery a system for controlling a battery to extend a driving mileage according to an exemplary embodiment of the present disclosure.
Figure 3B:
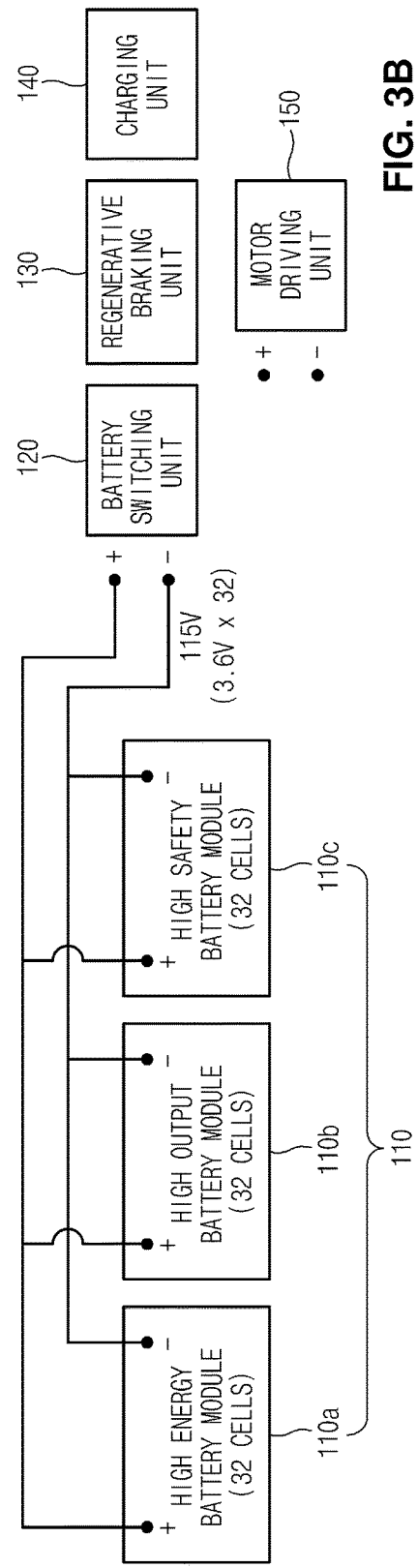

FIGS. 3A-3B are exemplary structure diagrams illustrating a method for controlling a battery of a system for controlling a battery to extend a driving mileage according to an exemplary embodiment of the present disclosure. Referring to FIG. 3A, when the accelerator is operated to drive the vehicle, the battery switching unit 120 may be turned off to connect the battery module 110 in series.

In particular, when the accelerator is operated, the high energy battery module 110a, the high output battery module 110b, and the high safety battery module 110c may be connected in series to supply the high voltage required to drive the motor to the motor driving unit 150. In particular, since a substantially high current may be required when the vehicle is driven at a substantially high speed, the load of the high output battery module 110b may be increased while since a low current is required when the vehicle is driven at a substantially low speed or a substantially constant speed, the load of the high output battery module 110b may be reduced and a load may be distributed into the high energy battery module 110a or the high safety battery module 110c. In other words, the high output battery module 110b may have a substantial change in the load, but the change in the load of the high energy battery module 110a or the high safety battery module 110c may be substantially constant A load deviation between the battery modules 110 may be controlled by the battery switching unit 120 or a battery management system (BMS). Further, when the accelerator is operated, the driver may adjust a high output demand for high speed driving and a low output demand for low speed driving or constant speed driving depending on a strength of the accelerator pedal.

Referring to FIG. 3B, when the accelerator is not yet operated, the battery switching unit 120 may be turned on to connect the battery modules 110 in parallel. The voltage (energy balancing) may be balanced between the battery modules 110 connected in parallel to manage the voltage deviation which occurs between the battery modules 110. In particular, when the accelerator is not yet operated, the high energy battery module 110a, the high output battery module 110b, and the high safety battery module 110c may be connected in parallel to balance the voltage among the respective battery modules 110a, 110b, and 110c and disperse the charging energy among the respective battery modules 110a, 110b, and 110c. The high output battery module 110b may be charged through the regenerative braking unit 130 or the charging unit 140 and may be charged by discharging the high energy battery module 110a and the high safety battery module 110c.

When the vehicle is parked, stops, or is charged from the exterior, the battery modules 110a, 110b, and 110c may be connected in parallel to maintain about the same voltage, and in particular, use a low voltage and a high current when the vehicle is charged from the exterior and reduce the charging time.

As described above, according to the exemplary embodiments of the present disclosure, it may be possible to minimize the inter-cell deviation within the battery system and make the energy balancing by using the battery switching unit depending on the driving.

Further, according to the exemplary embodiments of the present disclosure, it may be possible to improve the safety of the vehicle by allowing the battery switching unit to convert the serial connection state of the plurality of batteries into the parallel connection state when the vehicle stops or is parked. Further, according to the exemplary embodiments of the present disclosure, it may be possible to provide the complexation of the battery by simultaneously connecting the batteries having a variety of output power, durability, energy quantity, and the like.

Although the exemplary embodiments of the present disclosure have been disclosed based on restricted configuration and drawings, the technical ideas of the present disclosure are not limited thereto. Therefore, those skilled in the art will appreciate that various modifications and changes may be made, without departing from the scope and spirit of the present disclosure as disclosed in the accompanying claims.

What is claimed is:

1. A system for controlling a battery to extend a driving mileage, comprising:
   a plurality of battery modules, wherein individual battery modules of the plurality of battery modules have different specifications;
   a battery switching unit configured to connect the plurality of battery modules in parallel when an accelerator is disengaged and connect the plurality of battery modules in series when the accelerator is engaged, wherein the battery switching unit is configured to turn on to connect the plurality of battery modules in parallel, wherein the battery switching unit is configured to turn off to connect the plurality of battery modules in series, wherein a first battery module among the plurality of battery modules is charged through a regenerative braking unit or a charging unit, and wherein the first battery module is charged by discharging a second battery module and a third battery module of the plurality of battery modules when the accelerator is disengaged; and a motor driving unit configured to receive an output by the battery switching unit when the accelerator is engaged.

2. The system according to claim 1, wherein the regenerative braking and the charging unit are configured to be connected to the plurality of battery modules.

3. The system according to claim 2, wherein the regenerative braking unit is configured to charge energy generated from a brake and the charging unit is configured to charge energy from an external charger.

4. A method for controlling a battery to extend a driving mileage, comprising:

maintaining, by a controller, about the same voltage by connecting a plurality of battery modules of a vehicle in parallel, wherein individual battery modules of the plurality of battery modules have different specifications, wherein a first battery module among the plurality of battery modules is charged through a regenerative braking unit or a charging unit, and wherein the first battery module is charged by discharging a second battery module and a third battery module of the plurality of battery modules when the accelerator is disengaged;

supplying, by the controller, an output required to drive a motor by turning off a battery switching unit and connecting the plurality of battery modules in series when an accelerator is engaged after the vehicle starts; and balancing, by the controller, voltage among the plurality of battery modules by turning on the battery switching unit and connecting the plurality of battery modules in parallel when the accelerator is disengaged.

5. The method according to claim 4, wherein in the maintaining of about the same voltage, the vehicle is parked, stopped, or is charged from an external charger.

6. The method according to claim 4, wherein any one of the plurality of battery modules is charged with energy generated from a brake or energy supplied from an external charger.

* * * * *